Nov. 12, 1968 R. GAYLOR 3,411,093

FREQUENCY TRACKING CIRCUITS

Filed Sept. 2, 1965 4 Sheets-Sheet 1

INVENTOR.
RANDALL GAYLOR
BY
S. C. Yeaton
ATTORNEY

INVENTOR.
RANDALL GAYLOR
BY
S. C. Yeaton
ATTORNEY

INVENTOR.
RANDALL GAYLOR
BY S. C. Yeaton
ATTORNEY

INVENTOR.
RANDALL GAYLOR
BY
[signature]
ATTORNEY 3,411,093
FREQUENCY TRACKING CIRCUITS
Randall Gaylor, Phoenix, Ariz., assignor to Sperry Rand Corporation, a corporation of Delaware
Filed Sept. 2, 1965, Ser. No. 484,621
10 Claims. (Cl. 328—14)

ABSTRACT OF THE DISCLOSURE

A frequency tracking circuit based on the gain-phase characteristics of a second order feedback servo system. At frequencies below the natural frequency of the system, $\omega_N$, the phase shift of the system is between zero and 90°, at $\omega_N$ it is 90°, and above $\omega_N$ it is between 90° and 180°. An output of the second order system is used as a reference for a full wave demodulator the input of which is the input to the second order system including the frequency which is to be tracked. The output of the demodulator is therefore a positive or negative D.C. voltage depending upon whether the frequency of the input signal is greater than or less than the natural frequency $\omega_N$, this output being used to vary $\omega_N$ to maintain D.C. output zero whereby the natural frequency of the second order system is caused to track the desired frequency of the input signal.

The present invention relates generally to servomechanisms and more particularly to control circuits therefor which modify the control signals thereof to produce desirable operating characteristics of the servomechanism, such circuits being generally referred to as shaping circuits.

The shaping circuit of the present invention is one which has the capability of tracking a resonant frequency in the control system and hence is particularly applicable to vehicle stabilization systems, but it will be understood that the circuit is equally applicable to any system requiring critical frequency sensing, tracking and control. The circuit of the present invention includes a frequency tracking circuit capable of tracking a resonant frequency whereby the shaping circuit can place any one of a variety of shaping characteristics at the resonant frequency.

The most significant objects and advantages of the circuit of the present invention are its flexibility of application and simplicity of implementation. As stated, it can form a variety of transfer functions which enables it to provide shaping and compensation at the frequency being tracked to provide increased stability or it may provide simple decoupling of an undesirable resonant frequency signal. If used as a tracking notch filter, for example, the amount of attenuation and the sharpness and/or bandwidth of the notch is easily adjustable.

The simplicity of implementation results from the use of common circuitry for frequency tracking and for generating the filter characteristics. This use of common circuitry ensures that no error will exist between the filter frequency and the lock-on frequency. This is a major improvement over known prior techniques which use a frequency tracking circuit to control a separate filter circuit.

Further objects and advantages of the tracking filter of the present invention include its ability to track and isolate frequencies that are relatively close together; it will not introduce extraneous signals into the control system loop; it may be easily controlled or limited to restrict the frequency travel to a desired frequency range; and the filter characteristics may be made a function of frequency.

Other objects and advantages not at this time particularly enumerated will become evident as a description of a preferred embodiment thereof proceeds, reference being made therein to the attached drawings in which.

Figure 2:
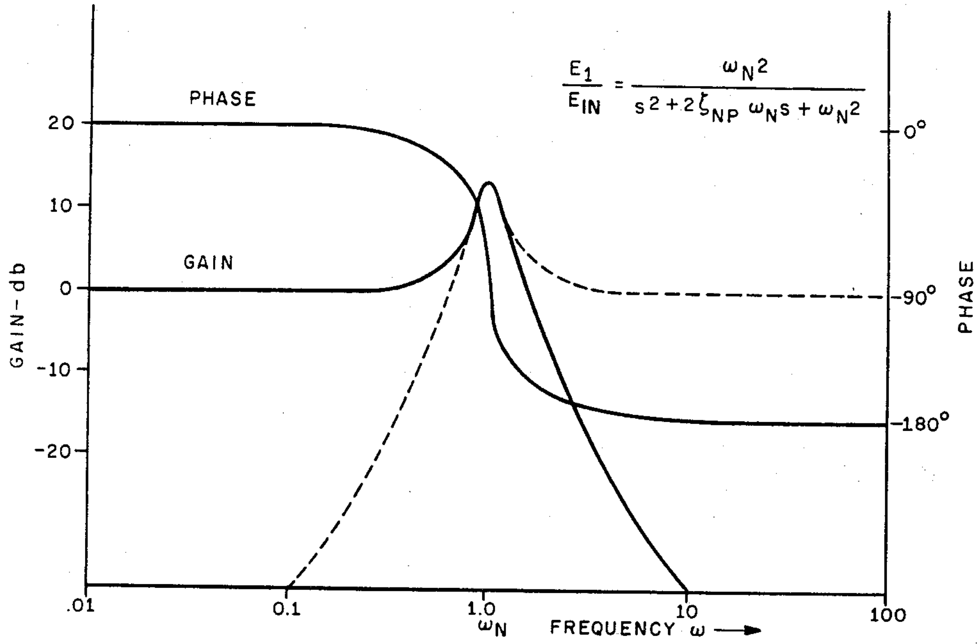
FIG. 2 is a typical gain and phase plot of a second order system.

The principle upon which the frequency tracking filter of the present invention is based is found in the analysis of the typical transfer function of a second order feedback system and the gain and phase vs. log frequency plot thereof. The elements of a typical second order system is illustrated within the dot-dash lines of FIG. 1 and a plot of the frequency transfer function of such a system is shown in the gain and phase vs. log frequency plot of FIG. 2. The transfer function of the second order system from its input $E_{IN}$ to its output $E_1$, that is, the ratio $E_1/E_{IN}$, may be derived as follows, where $s$ is the convention differential operation, $\omega_N$ is the natural or resonant frequency of the system, and $\zeta$ is the system damping ratio; reference being made to FIG. 1.

$$\frac{E_1 s^2}{\omega_N^2} = -E_{IN} - E_1 - \frac{2\zeta_{NP} E_1 s}{\omega_N} \quad (1)$$

rearranging:

$$E_{IN} = -\frac{E_1 s^2}{\omega_N^2} - \frac{2\zeta_{NP} E_1 s}{\omega_N} - E_1 \quad (2)$$

solving for $E_{IN}/E_1$ and inverting $$\frac{E_1}{E_{IN}} = -\frac{\omega_N^2}{s^2 + 2\zeta_{NP}\omega_N s + \omega_N^2} \quad (3)$$

which is the transfer function of a second order servosystem. The gain-phase plot of this transfer function, FIG. 2, shows that at the natural frequency of the system, $\omega_N$ and the resonant frequency substantially coincide; that a gain peak occurs at this frequency $\omega_N$; and that at this corner frequency the phase shift is 90°, above this frequency the phase shift is greater than 90° and below this frequency the phase shift is less than 90°. From this phase characteristic of the second order system, it can be seen that by sensing the change in phase that occurs on each side of $\omega_N$ and providing some means for varying the natural or resonant frequency $\omega_N$ in accordance with this change, the natural frequency of the second order system may be made to track any desired frequency $\omega$ contained in the input signal.

Figure 1:
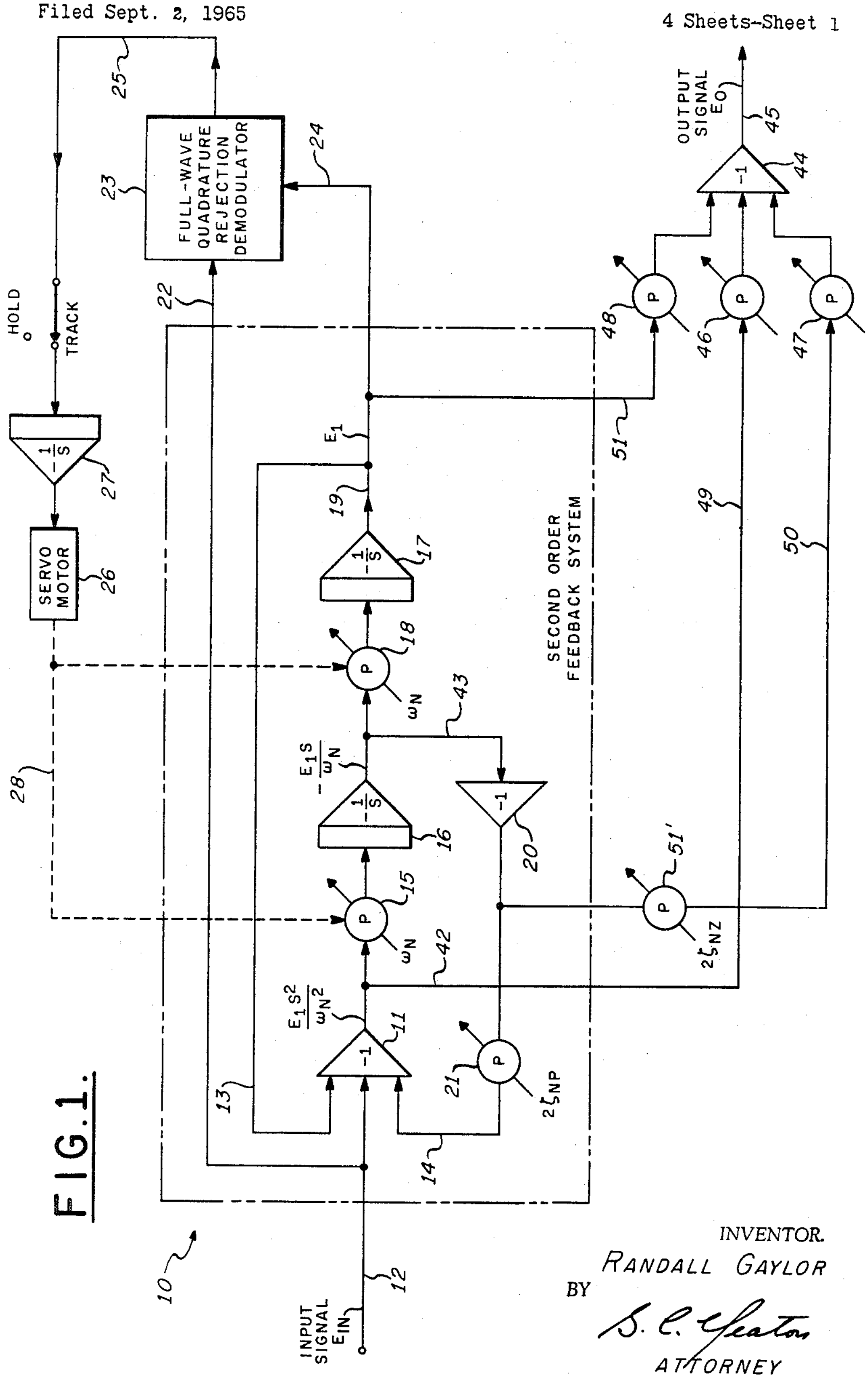
FIG. 1 is a block diagram of the filter circuit of the present invention.

Referring now to FIG. 1, the second order feedback system 10 comprises a plurality of operational amplifiers, which may be transistorized, encapsulated units or microelectronic units and conventionally designed to provide the individual transfer characteristics required to produce the system transfer function set forth in Equation 3. An input connection 12 is adapted to receive an alternating input signal $E_{IN}$ having a frequency component which is to be tracked by the subsystem 10. This input signal is combined with a displacement or position feedback signal $E_1$ on feedback connection 13, together with a subsystem velocity feedback signal on connection 14, in an operational amplifier 11. This amplifier serves to add the signals on leads 12, 13 and 14 and reverse their signs so that the output thereof represents the second derivative value $E_1s^2/\omega_N^2$ as defined in Equation 1 above. The output of amplifier 11 is applied through a variable impedance device 15, such as for example a potentiometer, to the input of operational amplifier 16. Amplifier 16 is an integrating amplifier and integrates the signal $E_1s^2/\omega_N^2$ whereby to supply as an output a signal representing the first derivative value $E_1s/\omega_N$. This signal is supplied to a further operational amplifier 17 through a further variable impedance device or potentiometer 18. Again, amplifier 17 has an integrating characteristic whereby the signal $E_1s/\omega_N$ supplied at its input is integrated to the value $E_1$ appearing on output lead 19, corresponding to the position or displacement output of the second order system 10.

First derivative or velocity feedback 14 is taken from the output of amplifier 16 reversed in sign as by amplifier 20 and multiplied by the value $2\zeta_{NP}$, which may be accomplished by means of a further potentiometer 21 or other suitable means. The value $2\zeta_{NP}$ determines the damping ratio for the second order system and is adjusted to provide the gain-phase characteristics shown in FIG. 2. As will be discussed below, the value of the damping ratio coefficient of the quadratic denominator of the transfer function 3 may be adjusted to provide different characteristics of the filter circuit.

As stated above and with reference to FIG. 2, the input signal undergoes a phase shift through the second order system that is dependent upon the frequency characteristic thereof. For frequencies below the natural or resonant frequency $\omega_N$ of the system, the phase shift is between 0° and 90°, at $\omega_N$ the phase shift is 90° and for frequencies above $\omega_N$, the phase shift is between 90° and 180°. Also the natural frequency $\omega_N$ of the system may be adjusted by varying the setting of potentiometers 15 and 18 together. Since a predetermined phase shift of the input signal occurs between the input and the output at the natural frequency $\omega_N$ of the second order system, it is possible to generate a control signal that has a predetermined value at the predetermined phase shift. Therefore, by adjusting the periodic natural frequency $\omega_N$ of the system in a manner to maintain the control signal at said predetermined value, the natural frequency of the system may be made to follow or track the frequency of the input signal.

Referring again to FIG. 1, the input signal $E_{IN}$ is connected to input 22 of a full-wave demodulator 23 and the second order system output $E_1$ from output connection 19 is applied at connection 24 as the reference voltage for the demodulator 23. A conventional full-wave demodulator may be employed and preferably one that has good quadrature and noise rejection characteristics. Thus, the output of the demodulator appearing on output connection 25 will be an average D.C. signal corresponding to components of the input signal that are in phase or 180° out of phase with the excitation or system output and will therefore constitute the control signal mentioned above. For a sine-wave input signal $E_{IN}$ having a frequency component $\omega$, the demodulator 23 will be excited by the output signal $E_1$ of the same frequency as $E_{IN}$ but shifted in phase in accordance with the transfer function "phase" curve of FIG. 2. For system input signals having a frequency $\omega$ less than $\omega_N$, an average D.C. signal of one polarity will appear on demodulator output 25. If $\omega$ is greater or higher than $\omega_N$, the D.C. signal will be of the opposite polarity. If $\omega=\omega_N$, the D.C. output of demodulator 23 will be zero. The demodulator 23 therefore constitutes a means for supplying a control signal which is indicative of any difference between the frequency of the filter input signal and the natural frequency of the second order system 10.

In accordance with the teachings of the invention shown in FIG. 1 the control signal 25 at the output of demodulator 23 is used to adjust the natural frequency $\omega_N$ of the subsystem 10 in a manner to reduce the control signal 25 to zero, thereby making the natural frequency $\omega_N$ equal to the frequency of the input. Since this adjustment is done on a continuous basis, the subsystem natural frequency $\omega_N$ is caused to track the frequency or desired frequency component of the signal applied to its input and the second order system becomes a frequency tracking circuit.

In the embodiment of the invention illustrated in FIG. 1, the tracking function is provided through electromechanical means. The output 25 of demodulator 23 is applied to an instrument servomotor 26 through a conventional integrating amplifier 27, the output 28 being connected to drive potentiometers 15 and 18 in the forward loop of the second order system 10 to thereby adjust the natural frequency $\omega_N$ thereof in a manner to reduce the output of demodulator 23 to zero. It will be appreciated that instead of the integrating amplifier 27, a linear amplifier may be employed and a conventional position feedback potentiometer may be driven by motor shaft 28, the signal thereof being combined in the usual manner with control signal 25 to position motor shaft 28 in accordance therewith. Furthermore, it will be understood by those skilled in the art, that instead of an electromechanical adjustment of $\omega_N$ by servo 26 and potentiometers 15 and 18, an all-electronic means may be employed. For example, servo 26 and potentiometers 15 and 18 may be replaced with conventional solid-state electronic multipliers controlled directly by the output of demodulator 23 for controlling the coupling between amplifiers 11 and 16 and 16 and 17.

Figure 3:
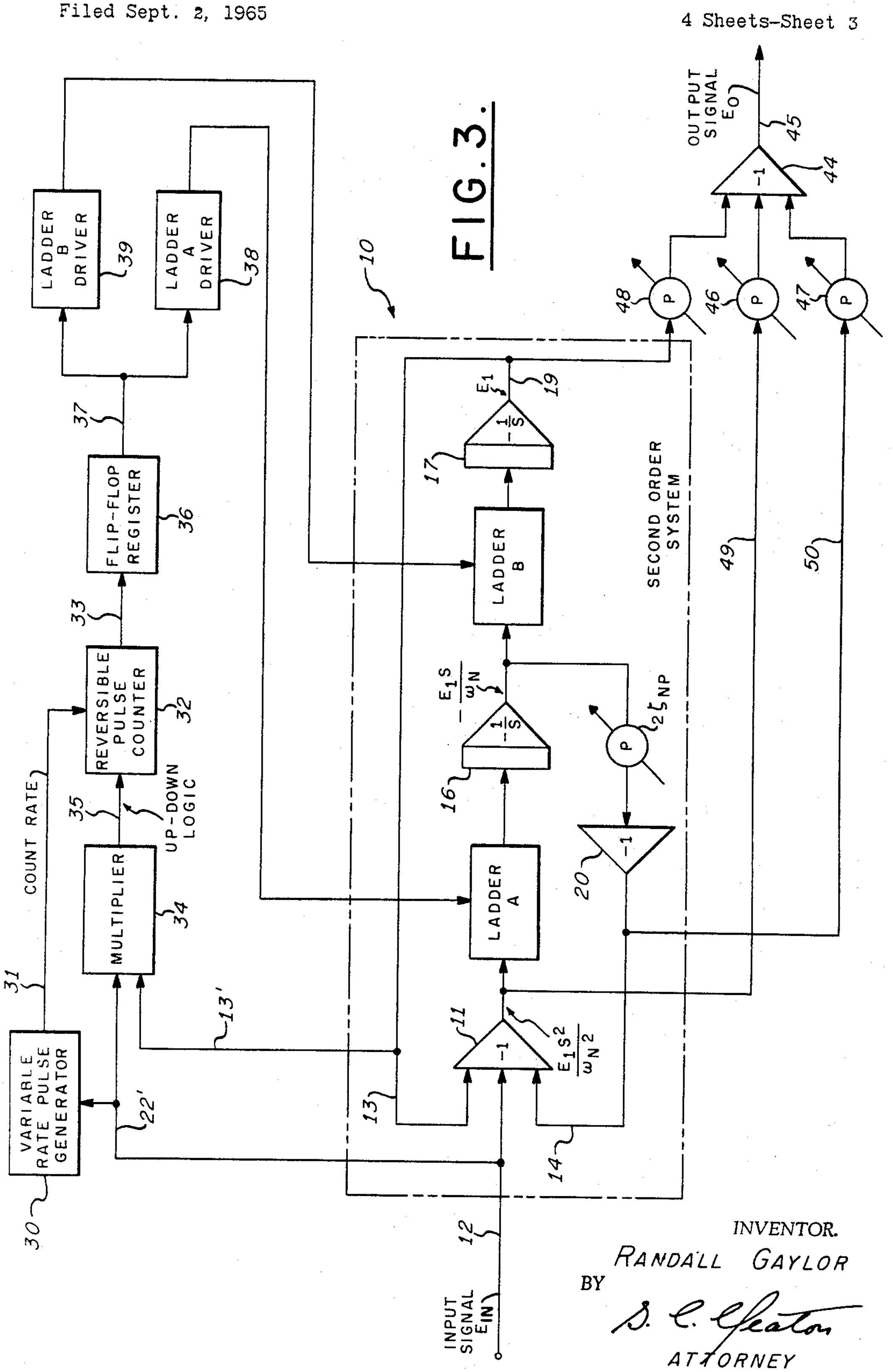
FIG. 3 is a block diagram of a modification of the filter circuit.

In FIG. 3 there is illustrated a further embodiment of the shaping network of the present invention. This embodiment is all-electronic and uses combined analog and digital techniques.

In this embodiment the full-wave demodulator 23, integrator amplifier 27, instrument servomotor 26 and potentiometers 15 and 18 of FIG. 1 are replaced by a solid-state digital integrator and digital-to-analog converters which are in the form of resistor ladder networks.

As shown in FIG. 3 the analog signal input $E_{IN}$ on connection 22' is supplied to a variable rate pulse generator 30 which converts the analog signal into a series of pulses at its output 31 having a repetition rate that is proportional to the voltage magnitude of the input signal $E_{IN}$. That is, for zero input voltage there are no pulses but as the input increases in one sense or the other, pulses are emitted, the higher the input the higher the pulse rate and vice versa. These pulses are applied to a conventional reversible binary counter 32 which counts the applied pulses and supplies at its output 33 a summation thereof, i.e. the number of pulses, N, equals the integral of the pulse rate, or $N=K\int E_I dt$. Multiplier 34 which is conventional receives as its two inputs the system input $E_{IN}$ and the position feedback signal on lead 13' and supplies at its output 35 a signal dependent upon the product of its two inputs. Thus, if either input is zero the output 35 will be zero, or if either of the inputs are not zero, the output 35 will be plus or minus dependent upon the relative senses of the inputs 13' and 22'. This output is supplied to the reversible counter 32 and determines whether the counter counts at all and, if it does, in which direction it will count. The magnitude of the product may be limited to a value just sufficient to control the counter. Flip-flop register 36 receives the output 33 of counter 32 and provides in a conventional manner an output on lead 37 that represents the pulse summation N.

In view of the foregoing it will be appreciated that the signal at lead 37 corresponds to the mechanical signal or output shaft position 28 of motor 26 of FIG. 1 and hence is used to adjust the natural frequency $\omega_N$ of the second order system through conventional ladder networks A and B in a direction and to an amount to maintain the output of multiplier 34 zero whereby the natural frequency $\omega_N$ of the second order system is commanded to track the frequency of the input signal $E_{IN}$. In effect, FIG. 3 is an analog-digital hybrid of FIG. 1 but has the advantages of being all-electronic and suitable for microminiaturization techniques.

The output 37 of register 36 may be arranged to control the $w_N$ of the second order system 10 in any suitable manner. One way is illustrated in FIG. 3 where the potentiometers 15 and 18 of FIG. 1 have been replaced by conventional resistor ladders A and B respectively. These ladders are driven by drivers 38 and 39 respectively. Each step of the ladder or stair case function is therefore equal to a discrete voltage level (quantized) dependent upon the total number N of pulses counted by counter 32. The accuracy or smoothness of the variation of $\omega_N$ by the ladder networks may be as desired or required by decreasing the step size, that is, by increasing the number of flips-flops or registers in the digital networks.

A tracking filter may be defined as a circuit which has the capability of tracking a resonant frequency in a control system loop and adjusting the characteristics of a shaping network as a function of that resonant frequency. The form of the transfer function of such a filter is given by $$\frac{As^2+Bs+C}{Ds^2+Es+F} \quad (4)$$

While the tracking filter of the present invention may be adjusted by adjusting the coefficients of (4) to generate a wide variety of transfer functions, the system illustrated herein will be described in connection with the generation of a tracking notch filter as an example.

Using the terms of FIGS. 1 and 3, a notch filter transfer function is given as $$\frac{E_o}{E_I}=\frac{s^2+2\zeta_{NZ}\omega_N s+\omega_N^2}{s^2+2\zeta_{NP}\omega_N s+\omega_N^2} \quad (5)$$

Figure 4:
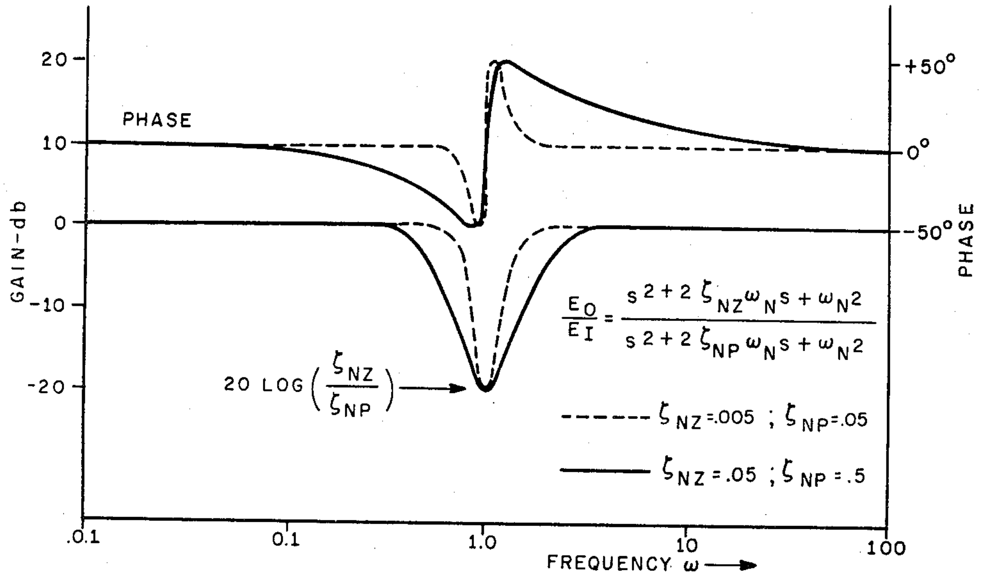
FIG. 4 is a gain and phase plot of a notch filter generated by the circuit of the present invention.

The gain and phase characteristics of this transfer function are illustrated in FIG. 4. It will be noted that the $s$ coefficients, $\zeta_{NZ}$ and $\zeta_{NP}$, determine the notch characteristics; the db attenuation being determined by the ratio of $\zeta_{NZ}$ to $\zeta_{NP}$ while the sharpness or bandwidth of the notch is determined by the values chosen for $\zeta_{NZ}$ and $\zeta_{NP}$. As indicated by the examples given in FIG. 4, these values are low for a sharp notch. In accordance with the teaching of this invention, the filter output signal, in the example given, a notch output signal $E_o$, is provided by summing signals already present in or generated by the second order system 10. The derivation of the notch filter transfer function from input $E_I$ to the output $E_o$ is as follows, reference being made to either FIG. 1 or FIG. 3.

$$E_o=\frac{E_1 s^2}{-\omega_N^2}-\frac{E_1 s}{\omega_N}D-E_1 \quad (6)$$

$$E_o=-E_1\left(\frac{s^2}{\omega_N^2}+\frac{s}{\omega_N}D+1\right) \quad (7)$$

from Equation 3 above $$\frac{E_1}{E_{IN}}=-\frac{\omega_N^2}{s^2+2\zeta_{NP}\omega_N s+\omega_N^2} \quad (3)$$

therefore $$\frac{E_o}{E_{IN}}=\frac{\left(\frac{s^2}{\omega_N^2}+\frac{s}{\omega_N}D+1\right)\omega_N^2}{s^2+2\zeta_{NP}\omega_N s+\omega_N^2} \quad (8)$$

simplifying $$\frac{E_o}{E_{IN}}=\frac{s^2+D\omega_N s+\omega_N^2}{s^2+2\zeta_{NP}\omega_N s+\omega_N^2} \quad (9)$$

Hence, for the notch filter, $D=2\zeta_{NZ}$.

From the foregoing derivation, it will be seen that the second order system 10 includes all of the terms for the filter, viz. $E_1 s^2/\omega_N^2$ appears on lead 42 as the output of sum amplifier 11, $E_1 s/-\omega_N$ on lead 43 as the output of integrating amplifier 16, and system output $E_1$ on lead 19.

These signals are combined in a conventional summing amplifier 44 such that their resultant output $E_o$ on lead 45 represents the sum of their negative values as shown by Equation 6. Adjustable attenuators 46, 47, 48, which may be potentiometers, are connected in the respective signal connections 49, 50, 51 supplying the above signals to amplifier 44. In the case of the tracking notch filter described herein, the gains of attenuators 46, 47, 48 are all set to unity. However, by varying the gains of these attenuators a variety of transfer functions may be obtained, the only restriction being the denominator of (9) must be a second order function with a resonant or natural frequency $\omega_N$.

It will be noted from Equations 6 to 9 that the damping ratio ($\zeta_{NP}$) of the tracking network or second order system 10 is the ($\zeta_{NP}$) of the notch and the value of D in (9) is ($\zeta_{NZ}$) and may be selected or adjusted by attenuator or potentiometer 51. As stated above, the ratio of the damping ratios control the characteristics of the notch and this ratio may be adjusted by attenuators 21 and/or 51. Also, in some applications of the filters (compensation for divergent body bending modes of a flexible vehicle, for example) it may be desired to use a negative $\zeta_{NZ}$ in which case lead 50 and potentiometer 51′ would be connected directly to lead 43 rather than after the sign reversing amplifier 20.

It is also an important feature of the tracking filter of the present invention that since the values set on potentiometers 46, 47 and 48 only affect the numerators of the filter transfer function, they do not in any way affect the tracking function of the second order system. However, it is to be noted that common circuitry is used in generating the filter characteristics and as a part of the frequency tracking circuit. This common usage ensures that no error will exist between the notch frequency and the lock-on frequency unless such error is commanded, i.e. by placing a bias on the modulator 23 for example.

The tracking filter of the present invention will not introduce extraneous signals into the control loop as do some tracking notch filter circuits. The tracking filter of the present invention will not introduce extraneous signals into the control loop, as do some tracking notch filter circuits, because the notch in the present invention is developed by a linear analog circuit which accurately provides the linear transfer function represented by Equation 9. Other techniques which rely on nonlinear or digital techniques result in systems which can introduce extraneous signals into the control loop at multiples of the tracking frequency.

Figure 5:
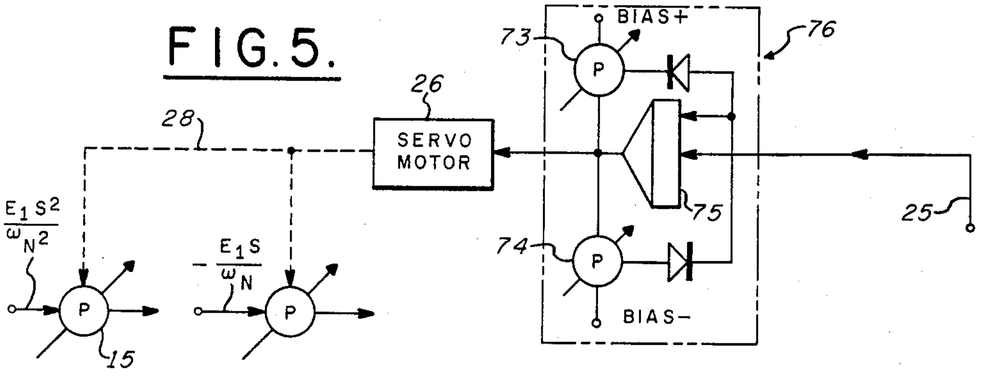
FIG. 5 is a modification of a portion of the circuit of FIG. 1.

Also, with the present filter, the frequency travel may be restricted to a desired range and the filter characteristics may be made a function of frequency. An example of a method to limit the frequency travel to a desired range is illustrated in FIG. 5. This figure shows a modification to amplifier 27 of FIG. 1 to provide a controllable limit on the output of 27. Since the output of 27 is a signal representing the tracking frequency $\omega_N$ the limits on the output of amplifier 27 represent the limits of frequency travel of the filter. The modification to amplifier 27 is the limited output integrating amplifier 76. This circuit is familiar to those skilled in the art. The circuit acts like a conventional integrator when the output is within the bounds set by attenuators 73 and 74. When a voltage is applied at the input which drives the output to the limit, the output will hold at the limit value until the polarity of the input is reversed causing the output to integrate back into the usable range.

The filter characteristics of the notch filter can be made a function of the tracking frequency simply by adding other attenuators to the output of servo motor 26 and using these attenuators to control the desired parameters. For example, if it is desired to make parameter $\zeta_{NZ}$ a function of frequency, attenuator 51′ can be replaced by an attenuator driven by servomotor 26. In addition, nonlinear control can be obtained by using a nonlinear attenuator. For implementation of the present invention utilizing solid state electronic multiplier in place of attenuators 15 and 18, similar multipliers along with function generators can be used to control parameters as any function of frequency desired.

A further advantage of the filter of the present invention resides in its ability to isolate and track frequencies that are relatively close together because of the sharpness of the phase break as shown in FIG. 2.

Figure 6:
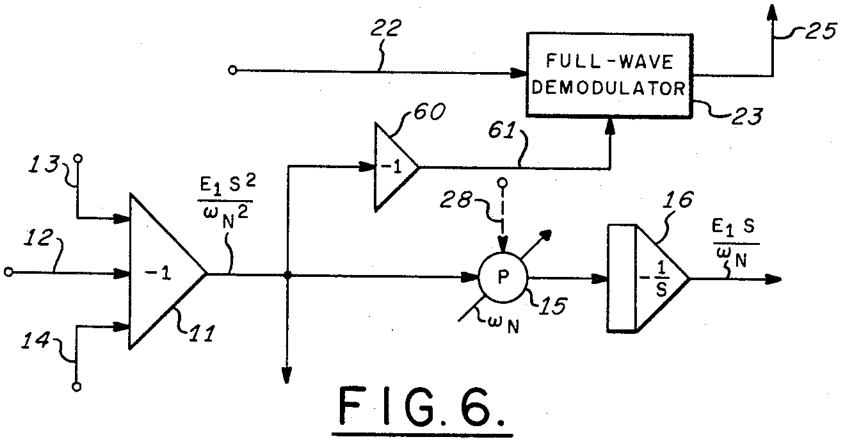
FIG. 6 is a further modification of a portion of the circuit of FIG. 1.

FIG. 6 illustrates a further modification of the tracking filter of FIG. 1 or 3. In FIG. 6 the reference signal for the full-wave demodulator 23 is derived from the output operational amplifier 11 instead of the output signal $E_1$ from operational amplifier 17. This signal, $E_1s^2/\omega_N^2$, is supplied to demodulator 23 via amplifier 60 and connection 61. Amplifier 60 serves to convert $E_1s^2/\omega_N^2$ to $-E_1s^2/\omega_N^2$ for proper sensing. In the gain-phase diagram of FIG. 2, the characteristic of this signal is illustrated by the dashed curve. It will be noted that the gain of this signal at low frequencies is low; it peaks at $\omega_N$ as does signal $E_1$ and does not drop off at the higher frequencies. Thus, this signal has a low gain when the $\omega$ of $E_I$ is high compared with the $\omega_N$ of the filter and if two frequencies are present, one higher than $\omega_N$ and the other lower, the tracking circuit will favor the higher of the two frequencies. Also, if a D.C. is present at the system input, $-E_1s^2/\omega_N^2$ is zero and no tracking error for such a D.C. signal can occur.

Conversely, when $E_1$ is used as the reference as in FIGS. 1 and 3, it has a low gain when $\omega$ is high compared with $\omega_N$, as shown by the solid gain curve of FIG. 2, and the circuit therefore tends to lock on the lower frequency if the input $E_{IN}$ contains two frequencies, one higher than $\omega_N$ and the other one lower.

Thus, a further characteristic of the tracking filter of the present invention is its ability to lock onto one frequency in the presence of two or more frequencies and will not take some position between the frequencies. The filter is effective in tracking resonant frequencies in a system and can attenuate to any degrees desired those resonant frequencies.

Figure 7:
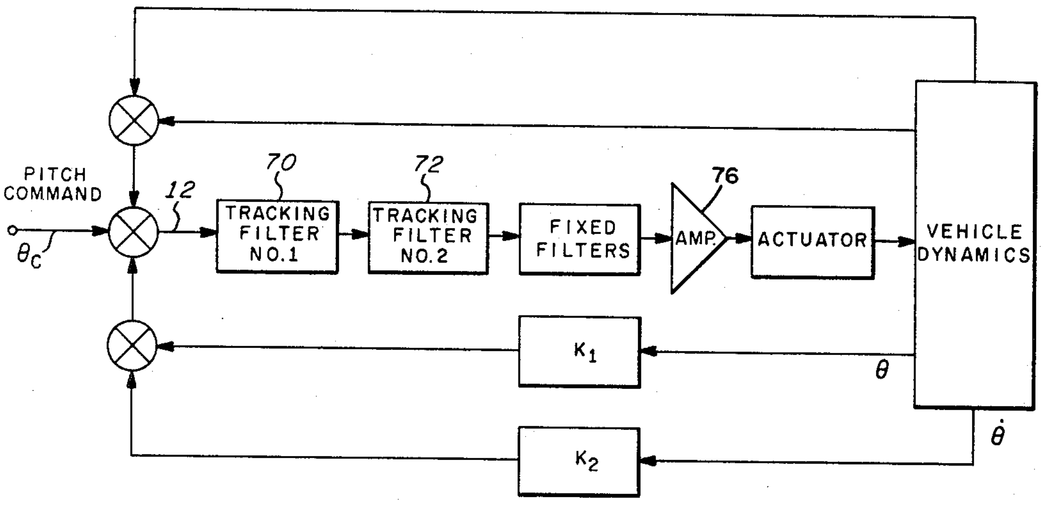
FIG. 7 is a block diagram of a servomechanism incorporating the filter circuit of the present invention.

This characteristic can be very useful in eliminating body bending feedbacks in flexible vehicle control loops. A typical automatic pilot control channel is shown in FIG. 7; in this case the pitch control channel. The tracking notch filter 70 of the present invention may be either that shown in FIG. 1 or FIG. 3 and in this application has a gain of 1 (0 db) at all frequencies except in the vicinity of $\omega_N$. At $\omega_N$ the notch filter provides a high degree of attenuation which may be adjustable by varying its parameters as discussed above. As also stated hereinabove, if a periodic frequency is present at the input 12 of the notch filter which varies in frequency as vehicle dynamics change due to variations in flight conditions, for example, the filter 70 will vary its $\omega_N$ to track that frequency. By limiting the range over which the filter tracks $\omega_N$, as by limited output integrating amplifier 76, the areas where high frequency body bending modes exist, the filter will track the most dominant frequency and attenuate signals of this frequency in the over-all system loop. This prevents the flight control system, whose parameters are determined primarily by rigid body stability considerations, from exhibiting a destabilizing effect on the bending mode at which the notch filter has tracked.

If the vehicle has several body bending modes which the automatic flight control system or autopilot provides destabilizing coupling, the notch filter will first track to the most dominate mode, decouple it so that it will damp out and then track the other mode and decouple it. If in the meantime the first mode again begins to build up in magnitude, the filter will track back to it and again decouple it. Thus, the tracking filter of the present invention is able to time share itself between several body bending modes. If, however, either or both modes diverge rapidly, the notch filter may become confused and be unable to keep both modes within desirable bounds. This can be avoided by connecting one or more filters in series as shown by filter 72 in FIG. 7. Thus, whichever frequency is tracked and attenuated by filter 70, it will be excluded in the next filter 72, thereby allowing filter 72 to select a different frequency from that of the first filter 70. Obviously, a number of filters can be placed in series in the event a particular vehicle exhibits problems with more than two bending modes.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A frequency tracking circuit for use in servomechanisms for tracking a particular frequency component of a plurality of frequencies, the combination comprising:

(a) a second order feedback subsystem having an alternating current input of variable frequency including said particular frequency, an alternating current output having a predominate frequency component dependent upon the gain-phase transfer characteristic of said subsystem at the natural frequency thereof and means for adjusting said natural frequency of said subsystem whereby to vary its gain-phase transfer characteristic, (b) means responsive to said input and output for detecting the difference in phase between the particular frequency component of said input and said output at the adjusted natural frequency of said subsystem and providing a control signal in accordance therewith, (c) means responsive to said control signal for varying said natural frequency adjusting means in a sense to reduce said control signal to zero whereby the natural frequency of said subsystem is caused to track said particular frequency of said input signal.

2. A frequency tracking circuit as set forth in claim 1 wherein said means for varying the natural frequency of said subsystem includes variable impedence means in the forward loop of said subsystem and responsive to said control signal for varying the gain-phase transfer characteristics thereof.

3. A frequency tracking circuit as set forth in claim 2 wherein said natural frequency adjusting means comprises motor means responsive to said control signal, said motor means being connected to drive said subsystem variable impedance means.

4. A frequency tracking circuit as set forth in claim 1 wherein said detector means comprises a full-wave demodulator means having its input terminals connected to receive said subsystem input and its reference terminals connected to receive said subsystem output whereby to provide a direct current output having a polarity dependent upon the relative phase shift between said subsystem input and said subsystem output.

5. A frequency tracking circuit as set forth in claim 1 wherein said detector means for deriving a control signal indicative of said phase shift comprises polarity logic means responsive to said input signal and said output signal and digital integrating means responsive to said input signal and controlled by said logic means.

6. A frequency tracking circuit as set forth in claim 5 wherein said means for adjusting the natural frequency of said subsystem comprises ladder network means in the forward loop of said subsystem and means responsive to said digital integrating means for controlling said ladder network means.

7. A shaping network comprising:

(a) a second order feedback system having an input signal, an output displacement signal, a velocity signal and a system error signal, said last mentioned signal comprising the resultant of all said signals, and said displacement, velocity and error signals being distinctly different and derived from selected points in said feedback system, (b) means responsive to said input signal and one of said other signals for varying the natural frequency of said system in accordance with the frequency of said input signal, whereby the natural frequency of said feedback system tracks the frequency of said input signal, and (c) further means responsive to said displacement signal, said velocity signal and said system error signal for algebraically combining the same and providing an output signal having a shaping characteristic that follows the natural frequency of said second order feedback system.

8. The shaping network set forth in claim 7 further including means coupled with at least one of the signals supplied to said further means for varying its gain with respect to the remaining signals whereby to vary the shaping characteristic of said network.

9. The shaping network set forth in claim 7 wherein each of said signals supplied to said further means has substantially unity gain whereby said shaping network provides a notch characteristic that tracks with the natural frequency of said second order feedback system.

10. A tracking notch filter as set forth in claim 9 wherein said feedback system further includes means for adjusting the ratio of the magnitude of said rate feedback signal supplied in said second order feedback system to that supplied to said combining means for adjusting the bandwith of said notch characteristic.

References Cited

UNITED STATES PATENTS

| | | | |
|---|---|---|---|
| 2,620,441 | 12/1952 | McCoy | 328—127 |
| 2,931,901 | 4/1960 | Markusen | 328—167 |
| 3,011,110 | 11/1961 | Ho et al. | 328—133 |
| 3,058,052 | 10/1962 | Keene | 328—134 |
| 3,241,077 | 4/1966 | Symth et al. | 328—155 |
| 3,307,408 | 4/1967 | Thomas | 328—167 |
| 3,355,668 | 11/1967 | Bonsel | 328—167 |

ARTHUR GAUSS, *Primary Examiner.*

H. DIXON, *Assistant Examiner.*